Figure 1:
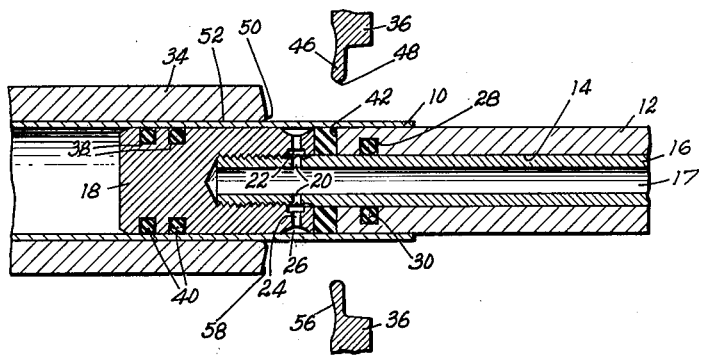

April 28, 1964    J. F. PEYTON    3,130,771
METAL BELLOWS FORMING APPARATUS
Filed Sept. 20, 1957

JOHN F. PEYTON
INVENTOR.

BY Fulwider, Mattingly,
and Huntley
ATTORNEYS.

United States Patent Office 3,130,771
Patented Apr. 28, 1964

3,130,771
METAL BELLOWS FORMING APPARATUS
John F. Peyton, Los Angeles, Calif., assignor to Federal-Mogul-Bower Bearings, Inc., Detroit, Mich., a corporation of Michigan
Filed Sept. 20, 1957, Ser. No. 685,229
8 Claims. (Cl. 153—73)

The present invention relates to metal forming and particularly to apparatus for forming a series of convolutions in a metal tube so as to produce a tubular bellows.

A variety of devices have heretofore been devised and used for the formation of tubular metal bellows. In one type of machine the straight tubing is deformed into convolutions by pressure applied through a circular rubber pad, which forces the tubing wall into a female die, or the straight tube is first bulged and then finish formed and sized into a die by the pad. However, it has been found with this type of machine that the rubber forming pad has a short service life and must frequently be replaced. This is due to the high forming pressures applied to the pad and the extreme distortions which the pad must undergo. Also contributing to the short service life of the pad is the fact that it tends to be extruded or squeezed between relatively moving parts of the machine or the workpiece and the machine.

It has also been observed with respect to this type of machine that the physical properties of the rubber or other elasto-meric material used in the pad impose certain design limitations on convolution height, or narrowness, and sharpness of bend.

In another type of machine for forming single convolutions in a straight tube, a split female die of fixed or predetermined convolution shape is moved into circumferentially embracing relationship around the tube. The split die is also divided along a median plane to define two complementing sets of annular split dies which are axially spaced apart along the straight tube. A mandrel or support for the tube includes an expansible chamber having a resilient membrane against the inner wall of the tube. Hydraulic pressure in the chamber first bulges the tube wall circumferentially between the separated die sets which are then moved axially together to fold the bulge into a convolution. Concurrently, the hydraulically pressed membrane deforms the tube into the closed dies.

In this type of machine the elastic forming membrane requires frequent replacement and is expensive. Moreover, in forming convolutions in small size tubing, the "stretch" or percentage of elongation of the membrane is excessive, so that its service life is short and frequency of replacement is accelerated.

The foregoing and other limitations and disadvantages of previously available bellows forming devices are eliminated by my invention.

It is a primary object of the present invention to provide an improved apparatus for continuously forming a series of single convolutions in straight tubing. The apparatus is of greatly simplified structure which eliminates short-lived, expensive rubber or elasto-meric pads or membranes, thus avoiding frequent shutdowns for replacement of such parts.

A further object of the invention is to provide an improved bellows forming apparatus for forming convolutions in multi-ply or slidably telescoped tubes as well as in single tubes.

Another object of my invention is to provide a method and apparatus for forming convoluted surfaces in which the forming is accomplished, in part, by direct pressure of a fluid on the inner wall of the tube, without any intermediary pads or membranes.

Yet another object of the invention is to provide a bellows forming apparatus which for any given tube size can be used to form a wide variety of convolution sizes without any change in dies or other expensive tooling.

It is also an object of the invention to provide a bellows forming apparatus of simplified construction that eliminates special forms of pads or membranes.

These and other objects and advantages of the invention will be apparent from the following description in conjunction with the accompanying drawings in which:

FIGURES 1 through 4 illustrate a preferred embodiment of apparatus for forming convolutions in accordance with my invention.

In accordance with my invention the tube to be convoluted is slipped over the free end of a stationary mandrel whose diameter is substantially the same as the inner diameter of the tube. An axial bore in the mandrel reciprocably slidably receives a hollow piston rod that carries a piston of the same diameter as the mandrel. A large elastic ring seal or pad is positioned on the piston rod between confronting ends of the mandrel and piston so that when the piston is moved to the right as viewed in the drawing, the pad expands into fluid sealing engagement with the tube.

A split die comprising a plurality of radially movable die segments is positioned in approximately the same plane as the pad. In order to clamp the tube in place on the mandrel during the convolution forming steps, the piston is caused to exert sufficient pressure on the pad to deform the tube into a slight initial bulge against the forward face of the die root when the die is closed. When the convolution is formed, the pad must provide a fluid seal against a rounded surface and this is also accomplished by the expansion of the pad between the piston and mandrel.

The piston is formed with an annular recess that communicates through the hollow piston rod with a source of hydraulic pressure. When pressure fluid is communicated with this recess, such fluid is prevented from escaping rearwardly onto the mandrel by the aforementioned pad. Such fluid is prevented from escaping forwardly towards the free end of the piston by a pair of O-ring seals at the end of the piston. Pressure fluid is thus confined between the inner wall of the tube and the tube support means.

A sleeve-like folding die or follower block is axially slidably mounted on the tube on the other side of the annular recess from the split die. When fluid pressure is admitted into the annular recess, the portion of the tube between the folding die and split die is bulged circumferentially. An adjacent portion of the tube between the end of the folding die and the pair of seals at the end of the piston is firmly held against the inner wall of the folding die by fluid pressure so that as the folding die advances toward the split die to deform the bulge into a convolution, a portion of the tube also advances. The size and shape of the resulting convolution are determined by the stroke of the folding die and the fluid pressure, either or both of which can be varied to achieve a wide latitude of designs.

Referring now to the drawings, wherein FIGURES 1 to 4 illustrate the steps of forming a metal or tubular bellows with a presently preferred embodiment of the invention, a straight tube 10 is supported on a stationary mandrel 12. The diameter of the mandrel 12 is substantially the same as the internal diameter of the tube 10 so that the tube can be moved axially to the right, as shown in the drawings, as successive convolutions are formed therein.

The mandrel 12 has an axial bore 14 extending therethrough which slidably receives a hollow piston rod 16, the passage through the piston rod being indicated by the numeral 17. The hollow piston rod thus serves as a conduit for the passage of pressure fluid which communicates with the piston rod 16 from a source (not shown). The passage of pressure fluid is controlled by suitable valve means (not shown) which is preferably automatically actuated and synchronized with the work cycle of the bellows forming apparatus in a manner which will later be set forth.

The end of the piston rod 16 which protrudes from the free end of the mandrel 12 rigidly mounts a piston 18 of the same diameter as the mandrel 12. The piston rod 16 has a plurality of radially extending ports 20 that communicate with an internal annular groove 22 formed in the piston 18 which serves as a manifold chamber to receive oil under pressure from the rod 16. The piston 18 is in turn provided with a plurality of radially extending orifices 24 that communicate the groove 22 with a circumferentially extending recess 26 of the piston 18. The pressure fluid is thus uniformly circumferentially distributed into contact with a selected portion of the inner face of the wall 10.

Figure 2:
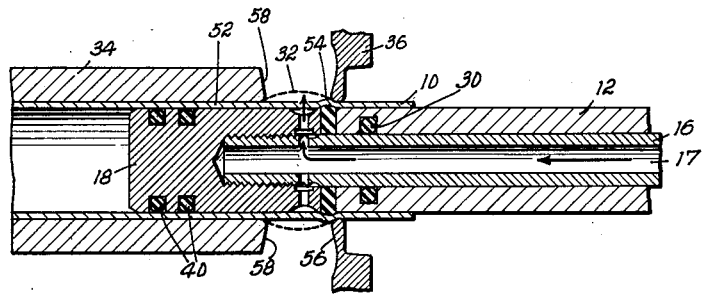

In forming a convolution, the portion of tube 10 adjacent to the circumferential recess 26 is bulged outwardly by fluid pressure to the position represented by the dotted outline 32 of FIGURE 2. This initial forming step takes place between a sleeve-like follower die 34 and a split die 36, both of which closely embrace the tube 10 on opposite sides of the recess 26. In order to confine the pressure fluid between the inner face of the tube 10 and the piston 18 for this purpose, suitable sealing elements are provided on opposite sides of the recess 26.

In order to prevent escape of pressure fluid over the forward end of the piston 18 this end of the piston is provided with a pair of circumferentially extending annular grooves 38 each of which receives an elastic O-ring seal 40. The portion of the tube 10 opposite to the seals 40 is enclosed by the follower die 34. This portion of the tube remains straight during the forming operation and therefore the O-rings 40 can be of the conventional type which will provide a satisfactory fluid seal. However, as will presently appear, the portion of the tube 10 which is opposite to the split die 36 is more difficult to seal against the escape of fluid because of the presence of the rounded root section of the convolution. Therefore, it becomes necessary to provide an arrangement for effecting a seal against the root portion of the convolution.

The confronting ends of the piston 18 and mandrel 12 define a circumferentially extending seal pocket 42 around the piston rod 16. Disposed in the pocket 42 is a circular elastic pad 44 which is preferably of the rectangular cross-sectional configuration shown. I have found that a conventional round cross-section O-ring can also be used, although it will not have as long a service life as the O-ring 44.

In order to prevent leakage of pressure fluid between the wall of the mandrel bore 14 and the rod 16 the bore 14 is provided with an annular internal groove 28 that receives an elastic O-ring seal 30.

Figure 3:
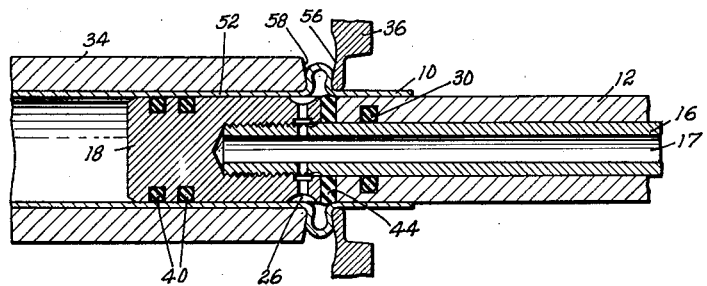

The split die 36 comprises a plurality of radially movable jaw segments which when closed, as viewed in FIGURES 2 and 3, define an opening of substantially the same diameter as the outside diameter of the tube 10. The segments of the split die 36 have a radially inwardly extending lip 46 whose thickness is substantially the same as the desired spacing between successive convolutions of the tube 10. The rounded edge 48 of lip 6 is formed with a radius substantially the same as the desired root radius of the tube convolutions. It will be noted that a rounded edge 50, also of the desired root radius, is provided in the confronting end of the folding die 34.

In order to lock the tube 10 in place on mandrel 12, the split die 36 is closed around the tube, as in FIGURE 2, and the piston 18 moved to the right by means (not shown) drivingly engaging the piston rod 16. The force on piston 18 is sufficient to cause pad 44 to deform the adjacent portion of tube 10 into a slight bulge 54 against the forwardly facing part of the die lip edge 48 whereby split die 36 provides a fixed abutment against which the bulged section 32 of tube 10 can subsequently be folded. This arrangement also provides a sealing area of appreciable longitudinal extent opposite split die 36 and the escape of pressure fluid therethrough is effectively accomplished even though the tube 10 is not straight at this point.

It should also be observed that the forward face of split die 36 is formed with a slight negative rake angle 56 and the confronting rear end face of folding die 34 is similarly formed with an equal negative rake angle 58. Thus, when folding die 34 is advanced towards split die 36 to fold the bulged section 32 into a convolution, as in FIGURE 3, the convolution walls are folded beyond a radial plane. When the dies 34 and 36 are released, as in FIGURE 4, the convolution walls spring back into radially extending position. This arrangement eliminates the necessity for any finish roll forming of the tube such as would be necessary if the confronting die faces were not provided with rake.

Figure 4:
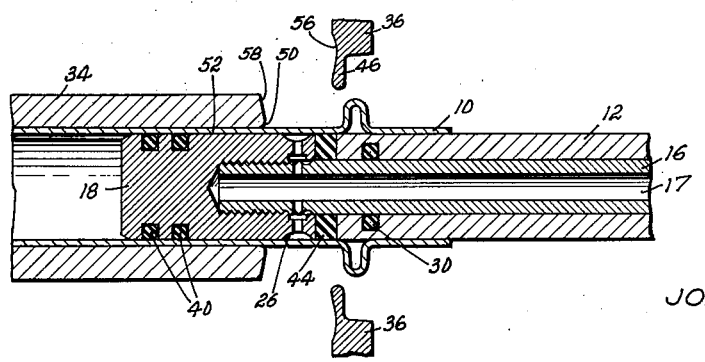

As will be apparent from an examination of FIGURES 3 and 4, the die lip 46 is long enough to permit the formation of convolutions of varying heights. Referring specifically to FIGURE 4, after the convolution has been formed in the tube 10 the tube is advanced over the mandrel 12 for a distance at least equal to the thickness of the die lip 46. When the split die 36 is once again closed, the crown of the formed convolution is received in the clearance space provided between the rounded edge 48 of the die lip 46 and the body of the die segment. As will be apparent any convolution of lesser altitude than the length of the die lip 46 can be received in this clearance space.

A convolution is formed in the tube 10 in the following manner. The tube is first slipped over the free end of the piston 18 and mandrel 12 until the portion thereof which it is desired to form into a convolution is positioned opposite to the annular recess 26. As is shown in the drawings, the inner face of the wall of tube 10 and the surface of the internal supporting means therefor define a fluid sealed annular chamber, in conjunction with the pair of seal rings 40 and the pad 44.

As is shown in FIGURE 2, the split die 36 is closed and piston 18 is next moved to the right in order to deform the pad 44 radially outwardly to increase in longitudinal dimension the sealing area between the O-ring 44 and the contacting portions of tube 10. This action also serves to form the initial bulge 54 to clamp the tube 10 in place between the expanded pad 44 and the split die 36. Fluid under pressure is then supplied to the annular recess 26 to form bulge 32 in that section of tube 10 which is disposed between the confronting faces of the folding die 34 and the split die 36. The initial bulge 54 is substantially absorbed by bulge 32 and the material represented by the dotted outline 32 is the material which will ultimately be formed into the desired convolution.

It will be observed that the pair of O-rings 40 are spaced forwardly from the annular recess 26 an appreciable distance, and that a portion of the tube 10 rearwardly of the O-rings 40 is embraced or confined by the folding die 34. This area is generally indicated by the numeral 52. Pressure fluid is thus admitted between the tube 10 and piston 18 in the area 52 between O-rings 40 and the rear end of the folding die 34 whereby this portion of tube 10 is tightly clamped against the folding die 34. The folding die 34 is then advanced to the right a predetermined distance towards the split die 34, which serves as a fixed abutment against which the final convolution is folded. That portion of the tube 10 which is disposed beneath and to the right of the split die 34 remains stationary during such folding. That portion of the tube 10 disposed to the left of the split die 36, by virtue of the aforementioned clamping action, advances with the folding die 34. Relative movement between the folding die 34 and tube 10 is thus avoided so that scratches and other marring effects on the tube 10 are eliminated.

In forming the bulge 32 a greater fluid pressure is used than when folding die 34 is advanced towards split die 36. For example, depending on the dimension and material of the tube, a pressure of 1500–2000 p.s.i. may be used to form bulge 32 which may be relieved to approximately 1000 p.s.i. when folding die 34 is advanced. This reduction of pressure reduces any tendency of fluid leakage past the seals 40 and pad 44 during the folding operation, but the pressure is nevertheless sufficient to prevent collapse of the convolution as it is being formed. Referring to FIGURES 2 and 3, the exposure of pad 44 to fluid pressure tends to rigidify or compact it to prevent its extrusion due to the movable action of piston 18.

Referring now to FIGURE 4, after the convolution has been formed in tube 10 the fluid pressure is relieved from the annular recess 26 and the dies 34 and 36 are retracted. Release of the dies permits the convolution to straighten to the configuration shown in FIGURE 4 and an indexing mechanism advances the tube 10 to the right one step, in order to dispose the formed convolution in alignment with the clearance space provided in the split die 36. The cycle is then repeated to form similar convolutions in the tube 10.

It will be apparent that the dimensions of the convolutions can be varied by varying the stroke of the folding die 34 or by varying the fluid pressure applied to the tube 10. Either or both of these factors can be varied so that a wide variety of convolution shapes can be achieved on any tube of the same diameter without altering the configuration of the external dies 34 and 36.

While there has been shown herein what is considered to be a presently preferred embodiment of the present invention it will be apparent that various modifications and changes may be made with respect to the foregoing description without departing from the spirit of the invention or the scope of the following claims.

I claim:

1. Apparatus for forming convolutions in a tube, comprising: internal support means for slideably mounting said tube; first external die means adapted for embracing said tube to provide an abutment against which a portion of said tube can be folded; elastic means in said tube opposite said die means; means to radially expand said elastic means to initially circumferentially bulge said tube against the root section of said die means and to define a fluid seal between the rounded root portion of a convolution to be folded against said means and said support means; axially movable second external die means embracing said tube and spaced from said first die means; fluid sealing means between said support means and tube opposite said second die means; means for communicating the space between said tube and support means intermediate said elastic means and fluid sealing means with a source of fluid pressure to further bulge said tube wall outwardly in the length of said tube between said die means; and means to advance said movable second die means towards said first die means to fold said bulged section into a convolution.

2. Apparatus for forming convolutions in a tube, comprising: a cylindrical internal support for slideably receiving said tube; a piston adapted to slideably receive said tube mounted at the free end of said support and having means defining an annular chamber with a wall section of said tube; an elastomeric pad between the confronting ends of said support and piston; split die means adapted for embracing said tube opposite said pad; means to move said piston towards said support to radially outwardly deform said pad to force a portion of said tube to abut against said split die means and to force said pad into fluid sealing engagement with the root portion of a convolution positioned thereon; fluid sealing means between said tube and said piston on the opposite side of said chamber from said pad; axially movable die means adapted for coaxially receiving said tube on the opposite side of said chamber from said immovable die means; means for communicating said chamber with a source of fluid pressure to bulge a portion at least of said wall section outwardly; and means to advance said movable die means towards said immovable die means to fold said bulged section into a convolution.

3. Apparatus for forming convolutions in a tube, comprising: a fixed internal support for slideably mounting said tube; a hollow piston rod mounted in said support for longitudinal reciprocal movement; a piston rigidly affixed to one end of said rod adjacent the free end of said support having a circumferential recess adapted for defining an annular chamber with a wall section of said tube, said chamber communicating through passage means in said piston with the interior of said hollow piston rod; an elastomeric pad between the confronting ends of said support and piston that sealingly engages said tube when said piston rod is actuated to move said piston towards said support to deform said pad; fluid sealing means between said tube and said piston on the opposite side of said chamber from said pad; split die means adapted for embracing said tube opposite said pad; axially movable die means for embracing said tube on the opposite side of said chamber from said immovable die means; means for communicating said chamber through said hollow piston rod with a source of fluid pressure to bulge said wall section outwardly; and means to advance said movable die means towards said split die means to fold said bulged section into a convolution.

4. Apparatus for forming convolutions in a tube, comprising: a cylindrical internal support for said tube; a piston mounted on a free end of said support and adapted to be slideably received in said tube and having means defining an annular chamber with a wall section of said tube; an elastomeric pad mounted between the confronting ends of said support and piston; means to move said piston rearwardly towards said support to force said pad into circumferential fluid sealing engagement with said tube; fluid sealing means between said tube and said piston on the opposite side of said chamber from said pad; a folding die around said tube and piston with its rear end portion overlying a portion of said chamber; means associated with said piston and support for communicating said chamber with a source of fluid pressure to circumferentially bulge the section of said tube between said folding die and said die means, and to clamp the section of said tube overlain by said folding die against said folding die; and means to advance said folding die towards said die means to fold the bulged section of said tube into a convolution, the clamped section of said tube advancing with said folding die.

5. Apparatus for forming convolutions in a tube, comprising: a fixed internal support for said tube; a hollow piston rod mounted in said support for longitudinal reciprocal movement; a piston of substantially the same diameter as said support rigidly affixed to one end of said rod adjacent the free end of said support having a circumferential recess adapted for defining an annular chamber with a surrounding wall section of said tube, said chamber communicating with the interior of said hollow piston rod; an elastic circular pad mounted on said piston rod between the confronting ends of said support and piston; axially immovable die means adapted for embracing said tube opposite said pad; means drivingly connected to said piston rod to move said piston rearwardly towards said support to cause said pad to radially deform a portion of said tube into abutment with the forward face of said immovable die means and into fluid sealing engagement with said tube; fluid sealing means mounted on said piston on the opposite side of said chamber from said pad and adapted for sealing engagement with said tube; a folding die adapted for embracing said tube with its rear end portion overlying a portion of said chamber; means for communicating said chamber through said hollow piston rod with a source of fluid pressure to circumferentially bulge the section of said tube between said folding die and said die means and to clamp the section of said tube overlain by said folding die against said folding die; and means to advance said folding die towards said die means to fold the bulged section of said tube into a convolution, the clamped section of said tube advancing with said folding die.

6. Apparatus for forming convolutions in a tube comprising: a fixed support adapted for coaxially internally slideably supporting said tube; a hollow piston rod coaxially slideably mounted in said support for longitudinal reciprocal movement; a piston of substantially the same size as said support rigidly affixed to one end of said rod adjacent the free end of said support and having a circumferential groove formed therein adapted to define an annular chamber with a surrounding wall section of said tube when said tube is slideably supported on said support and said piston, said piston also being formed with passage means for providing fluid communication between said chamber and the interior of said hollow piston rod; an elastic pad concentrically mounted on said piston rod between the confronting ends of said support and said piston and adapted for fluid sealing engagement with the interior of said tube; axially immovable die means adapted for radial movement into and out of embracing contact with said tube around said pad; means drivingly connected to said piston rod to move said piston rearwardly towards said support to cause said pad to radially deform a portion of said tube into abutment with the forward face of said axially immovable die means once said die means is closed around said tube whereby a portion of said tube rearwardly of said closed die means is held against axial movement; a pair of elastomeric O-ring seals mounted on said piston on the opposite side of said groove from said pad and adapted for fluid sealing engagement with interior of said tube; an axially movable tubular folding die slideably surrounding said tube and having a rear end portion extending axially rearwardly beyond said pair of O-ring seals; means for communicating said groove through said hollow piston rod with a source of fluid pressure to circumferentially outwardly bulge the section of said tube between said folding die and said die means and to clamp the section of said tube between said pair of O-ring seals and the rear end of said folding die against said folding die; and means to advance said folding die towards said die means to fold the bulged section of said tube into a convolution, the clamped section of said tube advancing with said folding die while said piston is held against concurrent movement by said fixed internal support and said pad.

7. Apparatus for forming transverse corrugations on tubes, comprising in combination, a stationary mandrel for supporting the tube interiorly, the mandrel having an axial channel and a lateral port communicating with said channel and the exterior of the mandrel for supplying pressure fluid within a tube telescoped thereover; separate circumferential fluid sealing means of resilient material carried by the mandrel at fixed spaced points therealong, one on each side, axially, of the port, for forming fluid seals between the tube interior and mandrel exterior to provide for direct contact of the interior of the tube by the pressure fluid, said fluid sealing means being located a sufficient distance apart to provide sufficient tube length between them to form a corrugation of the maximum size desired, said mandrel having relatively axially movable portions for axially compressing one of said fixed fluid sealing means therebetween to increase the pressure of contact of said one fluid sealing means with the interior of said tube; means for causing relative axial movement of said portions of said mandrel; means for holding the mandrel in axially fixed position, leaving one end clear for the feed of tubes thereover; radially movable dies formed and arranged to grip the tube exteriorly immediately adjacent said one of said sealing means; an axially reciprocable die surrounding the mandrel and closely embracing a tube thereon, one end of said die being located so as to be axially reciprocable in the space between the seals to approach and recede from the radially movable dies, said one end of the die in its remote position overlying the seal remote from said radially movable dies and leaving a sufficient portion of the tube exteriorly free to form an outward bulge and corrugation; means for operating said radially movable dies to clamp the tube and hold it; means for introducing pressure fluid through said mandrel into the space inside the tube between the seals, with the said axially reciprocable die in a remote position, to form a bulge and to assist in forming a complete corrugation; and means to axially reciprocate the die toward said radially movable dies to engage the bulge and axially compress it until a corrugation is formed.

8. Apparatus for forming transverse corrugations in a tube, comprising in combination, an elongate mandrel adapted to be positioned within the tube for supporting the tube interiorly, the mandrel having a longitudinal channel and a lateral port communicating with said channel and the exterior of the mandrel for supplying fluid under pressure against the interior of the tube telescoped thereover; separate circumferential fluid sealing means carried by the mandrel at two spaced points therealong, one on each side, longitudinally, of the port, for forming fluid seals between the tube interior and mandrel exterior to provide for direct contact of the interior of the tube by the fluid, said fluid sealing means being located a distance apart to provide at least a length of tube between them sufficient to form a corrugation; means for holding the mandrel in longitudinally fixed position, leaving one end clear for the feed of the tube thereover; a first die for engaging and supporting the tube exteriorly immediately adjacent one of said sealing means; a second die surrounding the mandrel and adapted to closely embrace and support the exterior of the tube thereat, said second die overlaying the seal remote from said first die and being spaced from the first die a distance to provide a sufficient portion of the tube exteriorly free to form an outward bulge and subsequent corrugations; means for introducing fluid under pressure through said channel and port into the space inside the tube between the seals, to form a bulge in the exteriorly free portion of the tube between the dies; and means for longitudinally reciprocating the dies toward each other for longitudinally compressing the bulge until a corrugation is formed while maintaining the sealing means the same distance apart and in which the mandrel is composed of two parts with each having a lateral surface, means interconnecting the parts for enabling the surface to move longitudinally relative to each other, one of said sealing means being elastic and located between the surfaces whereby movement of the surfaces longitudinally towards each other compresses the sealing means to form a seal with the interior of the tube.

References Cited in the file of this patent
UNITED STATES PATENTS

| | | |
|---|---|---|
| 2,749,963 | Candee | June 12, 1956 |
| 2,773,538 | De Mers | Dec. 11, 1956 |